(12) United States Patent
Banks

(10) Patent No.: US 6,487,593 B2
(45) Date of Patent: *Nov. 26, 2002

(54) DATA PROCESSING WITH DISTRIBUTED MESSAGING PROBLEM DETERMINATION

(75) Inventor: Andrew David James Banks, Romsey (GB)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,045

(22) Filed: Apr. 27, 1999

(65) Prior Publication Data

US 2002/0010774 A1 Jan. 24, 2002

(30) Foreign Application Priority Data

Dec. 24, 1998 (GB) .............................................. 9828686

(51) Int. Cl.7 .............................................. G06F 13/00
(52) U.S. Cl. ...................................................... 709/224
(58) Field of Search ................................ 709/223, 224, 709/238, 200; 714/715, 712; 370/253, 15, 248, 249, 250

(56) References Cited

U.S. PATENT DOCUMENTS

| | | | | |
|---|---|---|---|---|
| 4,745,593 A | * | 5/1988 | Stewart | 370/15 |
| 5,563,875 A | * | 10/1996 | Hefel et al. | 370/15 |
| 5,627,766 A | * | 5/1997 | Beaven | 702/122 |
| 5,668,800 A | * | 9/1997 | Stevenson | 370/248 |
| 5,719,942 A | * | 2/1998 | Aldred et al. | 709/228 |
| 5,822,543 A | * | 10/1998 | Dunn et al. | 709/224 |
| 5,864,563 A | * | 1/1999 | Ratcliffe | 371/20.1 |
| 5,898,668 A | * | 4/1999 | Shaffer | 370/230 |
| 6,092,096 A | * | 7/2000 | Lewis | 709/200 |
| 6,104,720 A | * | 8/2000 | Kisor | 370/431 |
| 6,134,589 A | * | 10/2000 | Hultgren | 709/227 |
| 6,154,778 A | * | 11/2000 | Koistinen et al. | 709/228 |

OTHER PUBLICATIONS

IBM Technical Disclosure Bulletin, v38, N3, pp411–418, Mar. 1, 1995, "Dynamic Determination of Network Topology".

* cited by examiner

Primary Examiner—Moustafa M. Meky
(74) Attorney, Agent, or Firm—Edward H. Duffield

(57) ABSTRACT

A data processing method of testing a network of data processing units includes steps of sending a test message from an originating data processing unit to a destination data processing unit via an intermediate data processing unit; receiving at the originating data processing unit a channel definition from the intermediate data processing unit, the channel definition defining an action taken at the intermediate data processing unit to determine a next intermediate data processing unit to forward on the test message to; and displaying the channel definition at the originating data processing unit.

3 Claims, 1 Drawing Sheet

DATA PROCESSING WITH DISTRIBUTED MESSAGING PROBLEM DETERMINATION

FIELD OF THE INVENTION

This invention relates to the field of distributed data processing where a data processing operation takes place over a plurality of data processing units which are connected to each other via a network.

BACKGROUND OF THE INVENTION

It is increasingly common to distribute a data processing operation over a plurality of data processing units, with each of the units communicating over a data communications network (e.g., the Internet). One reason for this is that a particular data processing unit may be able to do a job better than another, so a first unit makes a request for a second unit to do a particular job and then to return the result back to the first unit.

It is also very common for there to be a large number of intermediate data processing units in between the first unit that makes a request and the second unit that is being requested to do the work. Each intermediate unit receives the request, performs some initial processing to determine what to do with it, and then forwards it on to the next unit.

In order to detect problems in the message flow between units, prior art teachings have employed a test message which is sent by an originating data processing unit into the network of intermediate units on its way to a destination unit. The test message arrives at various intermediate units in the network on its way to the destination unit and reports are sent back to the originating unit by each intermediate unit to report the exact path that the test message took on its way through the network. For example, the well known Advanced Peer to Peer Networking (APPN) and TCP/IP (Transmission Control Protocol/Internet Protocol) provide such functionality. U.S. Pat. No. 5,668,800 (commonly assigned to IBM Corp.) is another example of such prior art.

A major problem, however, still exists in this art. At each intermediate unit, a local administrator is permitted to enter commands to affect/control the processing that is taken by the intermediate unit in deciding where next to forward the request. As an example, perhaps the administrator of one intermediate unit prefers a particular neighboring intermediate unit over another for certain types of requests so that the administrator commands the intermediate unit to route the request to that particular neighboring intermediate unit. Thus, while it is helpful to use the above-described prior art technique to determine the path a message takes through a network of intermediate units, the human user at the originating unit has no idea as to why the test message has taken this particular path through the network. The local human administrator at each intermediate node has potentially made an arbitrary decision concerning where next to forward the message, and such arbitrariness makes it difficult to impossible for the human user at the originating unit to determine why the text message went through the particular path that it took, thus making detection and diagnosis of errors very difficult.

SUMMARY OF THE INVENTION

According to one aspect, the present invention provides a data processing apparatus for testing a network of data processing units comprising: means for sending a test message from an originating data processing unit to a destination data processing unit via an intermediate data processing unit; means for receiving at the originating data processing unit a channel definition from the intermediate data processing unit, the channel definition defining an action taken at the intermediate data processing unit to determine a next intermediate data processing unit to forward on the test message to; and means for displaying the channel definition at the originating data processing unit.

According to a second aspect, the present invention provides a data processing method having method steps corresponding to each element of the data processing apparatus of the first aspect of the invention.

According to a third aspect, the present invention provides a computer readable storage medium having a computer program stored on it which, when executed on a computer, carries out the functionality of data processing method of the second aspect of the invention.

Accordingly, due to the present invention, it becomes very clear at the originating data processing unit exactly why the intermediate data processing units have decided to select the particular adjoining intermediate data processing units that they selected in routing the test message to the destination data processing unit. This greatly helps a user at the originating unit to understand the particular network and thus make a better and more informed diagnosis of any network transmission problems.

That is, it is not good enough to just know which intermediate units a test message passed through (as the prior art provided). If you know why the message passed through a certain group of intermediate units you can, for example, determine whether a particular intermediate unit can be requested to modify its selection technique to select a different subsequent intermediate unit, if the chosen one is causing a problem for the originating unit. On the other hand, with the prior art, the user at the originating unit would not know whether the intermediate unit had made an arbitrary choice in selecting the next intermediate unit.

The invention removes much frustration of the user at the originating unit, because the user is not left wondering why the test message has taken a long circuitous route through a network of intermediate units when the user would have preferred a more direct route. If the reason is a good one, then the user will accept that there is not much that can be done to alter the situation. However, if the reason is not a good one, then the user can query the intermediate units and request that they alter their selection techniques so that a more direct path can be selected for future message transmissions through the network from this particular originating unit to the particular destination unit.

BRIEF DESCRIPTION OF THE DRAWINGS

The invention will be better understood by reference to the detailed description of a preferred embodiment thereof which will be given below in conjunction with the following drawing figures.

DETAILED DESCRIPTION OF THE PREFERRED EMBODIMENTS

Figure 1:
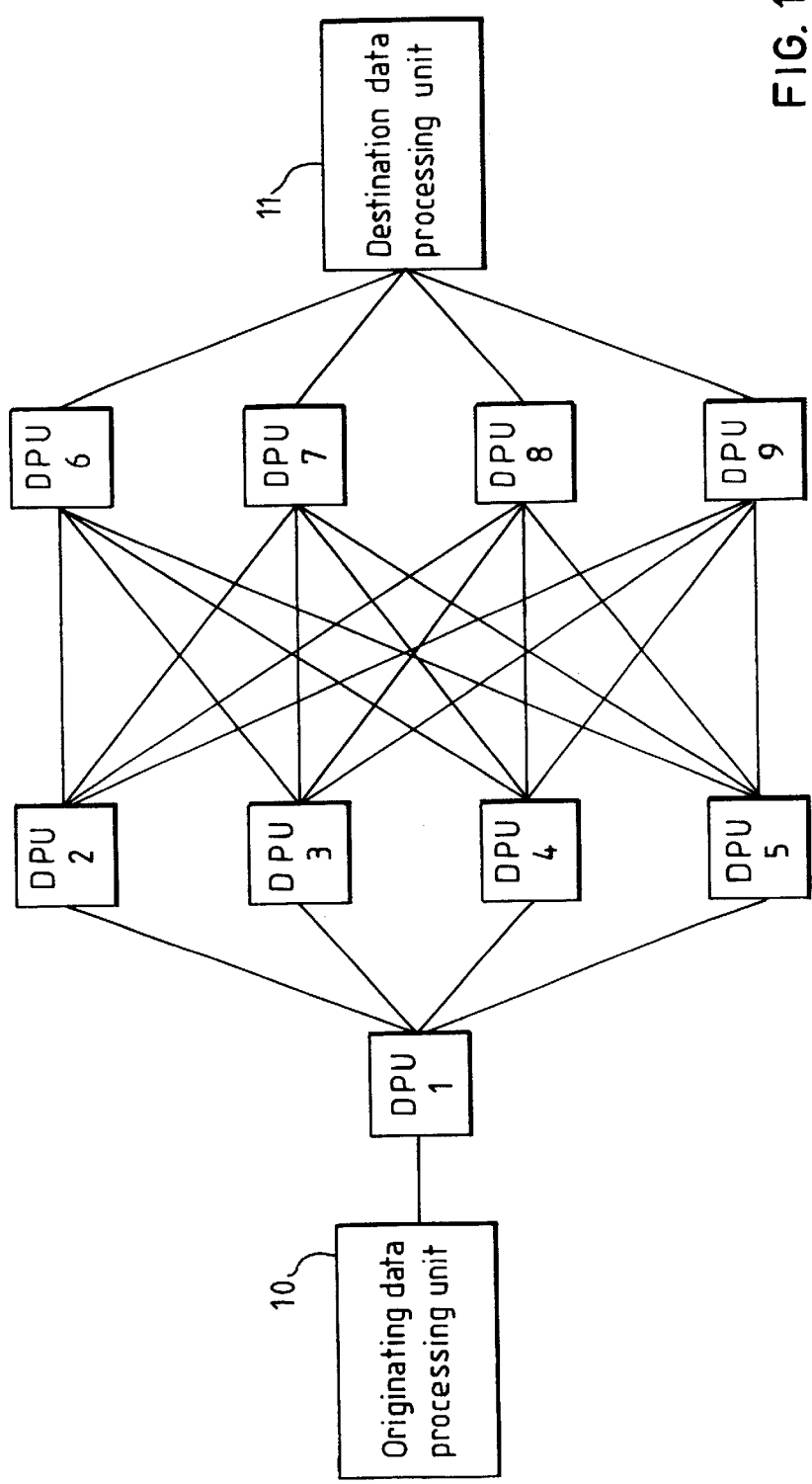
FIG. 1 shows a group of inter-connected data processing units forming a network, to which the preferred embodiment can advantageously be applied.

In FIG. 1, an originating data processing unit 10 sends a test message (20 in FIG. 2) through a network of intermediate data processing units 1–9 (DPU 1–DPU 9) to a destination data processing unit 11. The purpose of sending the test message is to determine the path from one intermediate unit to the next that the test message takes on its way to the destination unit, and, importantly, why each intermediate unit selects a particular subsequent intermediate unit rather than a different subsequent intermediate unit.

For example, originating unit 10 sends the test message to DPU 1 which then has a choice of four different DPU's (2–5) for selection of the subsequent intermediate unit. Oftentimes, this selection will be determined by human administrator action local to DPU 1. For example, a human administrator at DPU 1 has entered a command at DPU 1 commanding DPU 1 to select DPU3 rather than DPU 2, 4 or 5, as the subsequent intermediate unit for the forwarding of the test message on the way to the destination unit 11.

Once the test message makes its way to DPU 3 (using the above example), DPU 3 would then make a selection of one DPU out of the group DPU 6–DPU 9, and then forwards on the test message to the selected DPU (e.g., DPU 9). Again, the human administrator at DPU 3 enters commands local to DPU 3 and such commands form the channel definition with respect to DPU 3. This channel definition is then flowed back to the originating unit 10 from DPU 3. DPU 9 would then forward the test message to the destination data processing unit 11.

The set of actions taken by each intermediate unit in deciding which subsequent unit to select is called the channel definition. For each intermediate unit, this channel definition is sent back to the originating unit 10, where it is displayed via, for example, a CRT, for use by a human user at unit 10, in diagnosing message flow problems through the network. The channel definitions can be added to the prior art trace reports sent back from the intermediate units to the originating unit (such trace reports detailing which intermediate units were selected) in order to provide a complete description of the test message's trip.

The set of actions making up the channel definition at each intermediate unit need not be the result of a human administrator action which takes place synchronously with the receipt of the test message. The channel definition could also be, for example, a programmed action that has been pre-set to work a certain way, or it could also be an action determined by the running of a command program which determines the best action based on the present conditions of the intermediate unit and its relationship to its neighboring units.

Figure 2:
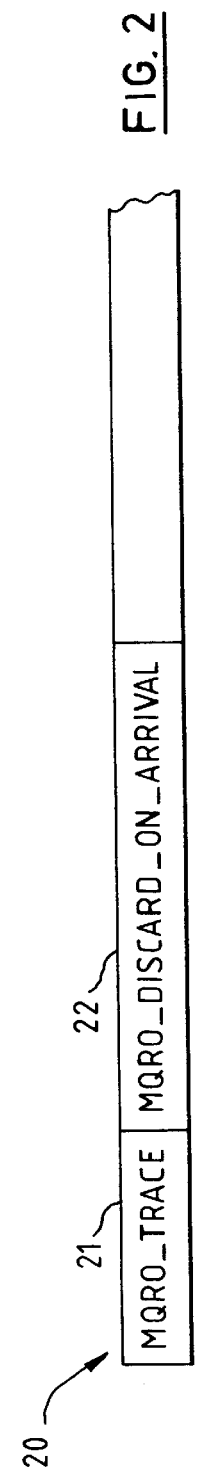
FIG. 2 shows the format of a test message, according to a preferred embodiment of the present invention.

The preferred format of the test message 20 of FIG. 2 which is sent from unit 10 to DPU 1 has two flags: MQRO_TRACE flag 21 and MQRO_DISCARD_ON_ARRIVAL flag 22. The MQRO_TRACE flag 21 instructs DPU 1, when the test message 20 is received at DPU 1, to send back to unit 10 a trace report message, which includes the channel definition. The MQRO_DISCARD_ON_ARRIVAL flag 22 instructs DPU 1, when the test message 20 is received at DPU 1, to discard the test message after the test message has made its way to the destination unit 11 (this is the point where each intermediate unit will have reported back to the originating unit 10 with its respective channel definition, so there is thus no need for each intermediate unit to retain the test message).

An example of what an administrator at a DPU might enter to control which DPU to forward a message on to next will now be given, in the well-known context of a messaging and queuing software system, where each DPU is acting as a messaging and queuing manager. The administrator of an intermediate node (e.g., NNN) has entered the definitions
DEFINE QREMOTE (TARGET) RNAME (TARGET.OTHER) RQMNAME (OTHER)
DEFINE CHANNEL(TO.OTHER) CONNAME (OTHER.IBM.COM)
XMITQ(OTHER) etc . . .
A portion of the output from the test message command that is returned to the originating DPU as a channel definition would then be . . .
NNN resolving "TARGET" using QREMOTE(TARGET) RNAME(TARGET.OTHER) RQMNAME(OTHER)
NNN sending on CHANNEL(TO.OTHER) CONNAME (OTHER.IBM.COM)
XMITQ(OTHER) etc . . .
thus indicating that the message had been resolved to the remote destination queue "TARGET.OTHER" and sent down the expected communications channel "TO.OTHER". This will be followed by more displays indicating the arrival of the message on the queue manager at network address "OTHER.IBM.COM".

I claim:

1. A data processing method of testing a network of data processing units comprising steps of:

sending a test message from an originating data processing unit to a destination data processing unit via an intermediate data processing unit;

receiving at the originating data processing unit a channel definition from the intermediate data processing unit, the channel definition defining an action taken at the intermediate data processing unit to determine a next intermediate data processing unit to forward on the test message to; and displaying the channel definition at the originating data processing unit.

2. A data processing apparatus for testing a network of data processing units comprising:

means for sending a test message from an originating data processing unit to a destination data processing unit via an intermediate data processing unit;

means for receiving at the originating data processing unit a channel definition from the intermediate data processing unit, the channel definition defining an action taken at the intermediate data processing unit to determine a next intermediate data processing unit to forward on the test message to; and means for displaying the channel definition at the originating data processing unit.

3. A computer program product stored on a computer readable storage medium for, when executed on a computer, carrying out a data processing method of testing a network of data processing units comprising steps of:

sending a test message from an originating data processing unit to a destination data processing unit via an intermediate data processing unit;

receiving at the originating data processing unit a channel definition from the intermediate data processing unit, the channel definition defining an action taken at the intermediate data processing unit to determine a next intermediate data processing unit to forward on the test message to; and displaying the channel definition at the originating data processing unit.

* * * * *